UNITED STATES PATENT OFFICE.

CARL AUER VON WELSBACH, OF VIENNA, AUSTRIA-HUNGARY, ASSIGNOR TO THE WELSBACH INCANDESCENT GAS LIGHT COMPANY, OF NEW JERSEY.

GAS-INCANDESCENT.

SPECIFICATION forming part of Letters Patent No. 403,804, dated May 21, 1889.

Application filed March 31, 1888. Serial No. 269,206. (No specimens.) Patented in France November 4, 1885, No. 172,064; in Belgium November 4, 1885, No. 70,739; in England March 13, 1886, No. 3,592; in Sweden April 14, 1886, No. 687; in Germany April 29, 1886, No. 41,945; in Finland July 10, 1886, No. 261; in Norway August 25, 1886, No. 88; in Italy October 13, 1886, XL, 415; in Portugal April 6, 1887, No. 1,127; in Russia December 31, 1887, No. 12,505, and in Austria-Hungary March 28, 1888, No. 44,989 and No. 5,176.

*To all whom it may concern:*

Be it known that I, CARL AUER VON WELSBACH, a subject of the Emperor of Austria, residing at Vienna, Austria-Hungary, have invented new and useful Improvements in Gas-Incandescents, (for which I have obtained Letters Patent in Great Britain, dated March 13, 1886, No. 3,592; Sweden, dated April 14, 1886, No. 687; Norway, dated August 25, 1886, No. 88; Finland, dated July 10, 1886, No. 261; France, dated November 4, 1885, No. 172,064; Certificate of Addition, dated April 22, 1886, No. 172,064; Belgium, dated November 4, 1885, No. 70,739; Portugal, dated April 6, 1887, No. 1,127; Russia, dated December 31, 1887, No. 12,505; Italy, Patent of Addition, dated October 13, 1886, Vol. XL, No. 415; Germany, dated April 29, 1886, No. 41,945; Austria-Hungary, applied April 9, 1886, granted March 28, 1888, No. 44,989 and No. 5,176,) of which the following is a specification.

This invention relates to improvements in the manufacture of gas-incandescent devices of the character described in Letters Patent No. 359,524, granted to me March 15, 1887, which refers to a skeleton hood, cap, or frame made of light net-work, fabric, or threads—such as cotton impregnated with a solution of the salts of refractory or infusible earthy oxides—and then exposed to heat, so that the material of the foundation fabric is soon consumed, leaving a skeleton-like body consisting of the incombustible and infusible earthy oxides resulting from the decomposition of the salts employed for impregnating the fabric. This hood, cap, or frame when heated to incandescence gives out a brilliant light, and will remain effective as an illuminant for hundreds of hours.

My present invention consists in improved gas-incandescent compounds or bodies, as hereinafter described, for producing a yellow light of high illuminating-power.

It is an important fact that the illuminating-power of incandescent bodies—such as lanthanum, cerium, yttrium, zirconium, and other metals of the refractory earths—is greatly increased by the addition of thorium oxide. Thorium oxide ($ThO_2$) fifty per cent., and lanthanum oxide ($La_2O_3$) fifty per cent., will give a very clear yellow light.

In the above compound lanthanum oxide can be replaced by yttrium earths (oxides of yttrium metals) or by cerium earths containing but little cerium and didymium.

The cerium-oxide compounds are as follows: Cerium oxide and magnesia; cerium oxide and zirconium oxide; cerium oxide and lanthanum oxide; cerium oxide and yttrium oxide; cerium oxide and thorium oxide. All these bodies give yellow light, but in varying degrees, the compounds with yttrium and thorium oxides giving a higher degree than the others.

It is generally very advantageous to combine the compounds with each other. Thus a body for producing yellow light may be formed of cerium oxide, ten per cent.; lanthanum oxide, twenty per cent.; yttrium oxide, thirty per cent.; zirconium oxide or magnesia, or both combined, forty per cent.

Pure lanthanum oxide and pure yttrium oxide may be entirely or partially replaced by a mixture of the other cerite earths (oxides or rare earth metals of the cerium and yttrium group) according to the effect desired.

For producing an orange-colored light, fifty per cent. of thorium oxide may be mixed with fifty per cent. of neodymium oxide, or with fifty per cent. of praseodymium oxide. When much praseodymium or neodymium, or both, (as didymium oxide,) is used, the light is intense orange-yellow.

A solution is made of the selected oxides in the form of a salt, preferably the nitrate or acetate, and with this solution the woven foundation fabric is thoroughly saturated. This woven fabric is preferably tubular in form, to adapt the resulting hood or cap for use with an Argand burner; but any other form may be given to the device. After the saturated or impregnated fabric has been dried it is exposed to heat, as that of a gas-flame, so as to consume the foundation fabric and leave a skeleton hood, cap, or frame composed of the refractory or infusible earthy oxides alone, the acid of the salt being driven off by the heat that burns out the textile fabric. This hood or cap when placed over the flame from a gas-burner and thereby rendered incandescent will give out a light of great power.

Thorium oxide, on account of its durability and property of increasing incandescence, is preferably a constituent part of the selected compound, and when combined with a cerite earth, as cerium or yttrium, will give satisfactory results in the production of yellow light.

Cerium not only gives a very desirable yellow light, but also greatly increases the life of the mantle, rendering it less likely to burn out rapidly or to become broken by jarring. It also enables the mantle to hold its shape better, and makes it in every way stronger and more durable.

What I claim as my invention is—

1. An incandescent burner for gas, consisting of a skeleton hood or frame composed of the oxide of thorium and a cerite earth, substantially as described.

2. An incandescent burner for gas, consisting of a skeleton hood or frame composed of the oxide of thorium and the oxide of yttrium, substantially as described.

3. An incandescent burner for gas, consisting of a skeleton hood or frame containing the oxide of thorium, the oxide of zirconium, and a cerite earth, substantially as described.

In testimony whereof I affix my signature in presence of two witnesses.

CARL AUER VON WELSBACH.

Witnesses:
FRED WILLIAMS,
EDMUND JUSSEN.